(12) United States Patent
Ezzat et al.

(10) Patent No.: US 8,615,927 B2
(45) Date of Patent: Dec. 31, 2013

(54) NONCONTACT OBSTACLE DETECTION SYSTEM USING RFID TECHNOLOGY

(75) Inventors: Hesham A. Ezzat, Troy, MI (US); James C. O'Kane, Shelby Township, MI (US); Pei-Chung Wang, Troy, MI (US); Doru N. Serban, Richmond Hill (CA); Bradley W. Jewell, Millbrook (CA)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 13/303,713

(22) Filed: Nov. 23, 2011

(65) Prior Publication Data

US 2013/0125467 A1 May 23, 2013

(51) Int. Cl.
  *E05F 15/10* (2006.01)
  *H02P 3/00* (2006.01)

(52) U.S. Cl.
  USPC ............................... 49/26; 49/25; 200/61.43

(58) Field of Classification Search
  USPC .......... 49/25, 26, 27, 28; 200/61.43; 318/266, 318/466
  See application file for complete search history.

(56) References Cited

U.S. PATENT DOCUMENTS

| | | | | |
|---|---|---|---|---|
| 5,506,567 A * | 4/1996 | Bichlmaier et al. | ......... | 340/555 |
| 5,955,854 A * | 9/1999 | Zhang et al. | ......... | 318/480 |
| 6,114,822 A * | 9/2000 | Ubelein et al. | ......... | 318/469 |
| 6,157,024 A * | 12/2000 | Chapdelaine et al. | ......... | 250/221 |
| 6,337,549 B1 * | 1/2002 | Bledin | ......... | 318/466 |
| 6,433,500 B1 * | 8/2002 | DeBoni | ......... | 318/443 |
| 6,693,273 B1 * | 2/2004 | O' Connor et al. | ......... | 250/221 |
| 6,750,624 B2 * | 6/2004 | Haag et al. | ......... | 318/467 |
| 6,875,976 B2 * | 4/2005 | Breed et al. | ......... | 250/221 |
| 6,968,746 B2 * | 11/2005 | Shank et al. | ......... | 73/780 |
| 6,984,818 B1 * | 1/2006 | Breed et al. | ......... | 250/221 |
| 7,015,666 B2 * | 3/2006 | Staus | ......... | 318/286 |
| 7,067,794 B2 * | 6/2006 | Le Gallo et al. | ......... | 250/221 |
| 7,151,350 B2 * | 12/2006 | Haag et al. | ......... | 318/280 |
| 7,307,395 B2 * | 12/2007 | Bouamra et al. | ......... | 318/445 |
| 7,319,301 B2 * | 1/2008 | Pribisic | ......... | 318/468 |
| 7,354,097 B2 * | 4/2008 | Jackson et al. | ......... | 296/146.1 |
| 7,359,783 B2 * | 4/2008 | Vives et al. | ......... | 701/49 |
| 7,378,641 B2 * | 5/2008 | Melcher et al. | ......... | 250/221 |
| 7,411,364 B2 * | 8/2008 | Takahashi | ......... | 318/286 |
| 7,479,888 B2 * | 1/2009 | Jacober et al. | ......... | 340/572.8 |
| 7,548,037 B2 * | 6/2009 | Boisvert et al. | ......... | 318/466 |
| 7,548,809 B2 * | 6/2009 | Westerhoff | ......... | 701/49 |
| 7,908,927 B2 * | 3/2011 | Washeleski et al. | ......... | 73/780 |
| 7,977,903 B2 * | 7/2011 | Kamiya | ......... | 318/469 |
| 7,984,655 B2 * | 7/2011 | Ogawa | ......... | 73/780 |

(Continued)

*Primary Examiner* — Katherine Mitchell
*Assistant Examiner* — Justin Rephann
(74) *Attorney, Agent, or Firm* — Quinn Law Group, PLLC

(57) ABSTRACT

An obstacle detection system includes a first component and a second component. The motor is configured to move the second component toward the first component. Radio frequency identification tags (RFIDs) are connected to one of the first component and the second component. A controller is operatively connected to the motor and has a transmitter operatively connected to the other of the first component and the second component. The transmitter is operable to create a magnetic field between the first component and the second component. Each of the RFIDs is operable to provide a respective signal in response to the field. The controller is configured to modify power delivery from a power source to the motor when the respective signals received by a receiver change due to at least a portion of the magnetic field being at least partially blocked or attenuated. A method of detecting an obstacle is also provided.

17 Claims, 3 Drawing Sheets

(56) References Cited

U.S. PATENT DOCUMENTS

| | | | |
|---|---|---|---|
| 8,067,914 B2* | 11/2011 | Gifford et al. | 318/466 |
| 8,143,832 B2* | 3/2012 | Holzmann et al. | 318/466 |
| 8,217,612 B2* | 7/2012 | Boisvert et al. | 318/466 |
| 2003/0071640 A1* | 4/2003 | Haag et al. | 324/674 |
| 2003/0071727 A1* | 4/2003 | Haag et al. | 340/562 |
| 2003/0233790 A1* | 12/2003 | Nuber | 49/28 |
| 2004/0017171 A1* | 1/2004 | Staus | 318/469 |
| 2004/0172879 A1* | 9/2004 | Regnet et al. | 49/26 |
| 2005/0187689 A1* | 8/2005 | Westerhoff | 701/49 |
| 2007/0266635 A1* | 11/2007 | Sugiura et al. | 49/27 |
| 2009/0235588 A1* | 9/2009 | Patterson et al. | 49/26 |
| 2009/0273473 A1* | 11/2009 | Tuttle | 340/572.1 |
| 2009/0322504 A1* | 12/2009 | Gifford et al. | 340/438 |
| 2010/0112336 A1* | 5/2010 | Wang et al. | 428/323 |
| 2010/0214079 A1* | 8/2010 | Desjeux | 340/10.34 |
| 2010/0325959 A1* | 12/2010 | De Coi et al. | 49/25 |
| 2012/0285086 A1* | 11/2012 | Boisvert et al. | 49/25 |

* cited by examiner

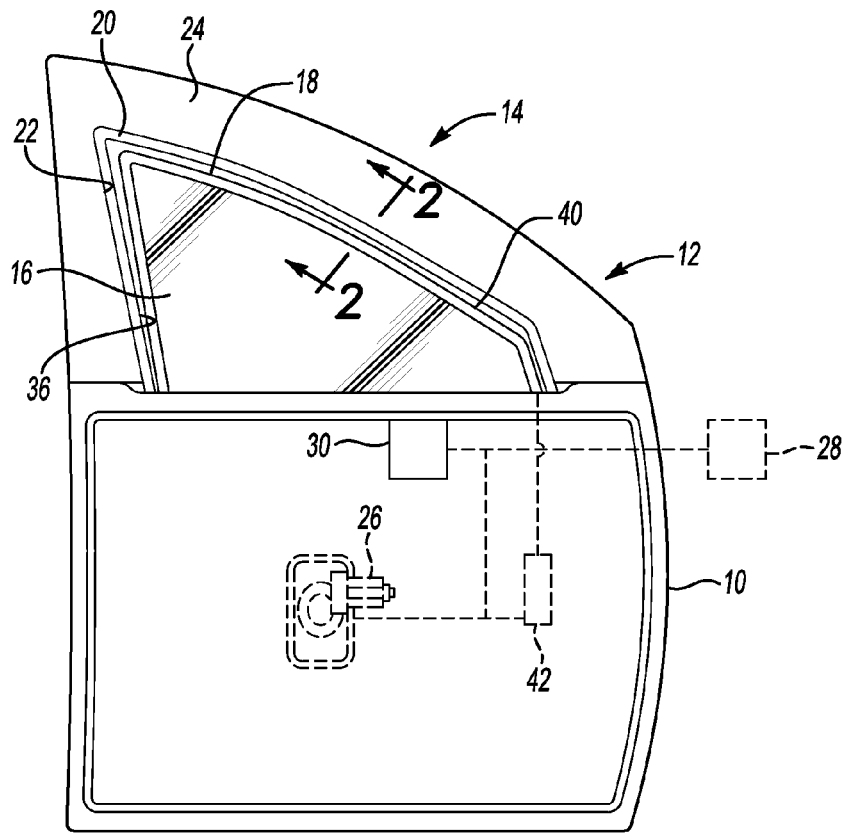
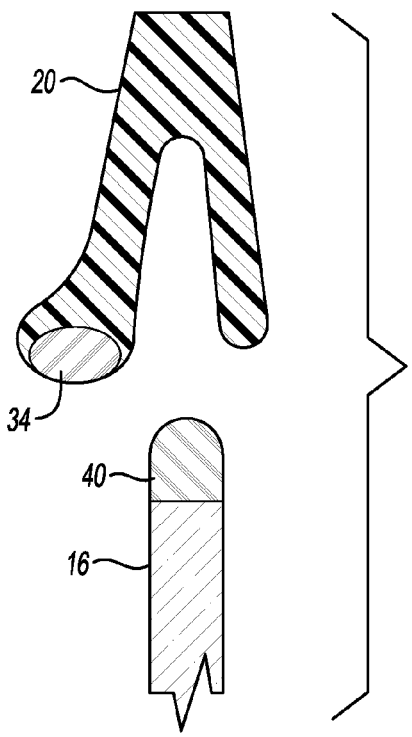

NONCONTACT OBSTACLE DETECTION SYSTEM USING RFID TECHNOLOGY

TECHNICAL FIELD

The present teachings relate to an obstacle detection system using radio frequency identification tags, such as for preventing contact with an obstacle when closing a vehicle window, and a method for detecting an obstacle between two components to prevent contact with the obstacle.

BACKGROUND

Modern automotive vehicles are frequently equipped with power windows, power doors, power liftgates, and other automatically openable and closable closure panels. For example, certain power windows are referred to as "express up" windows. These windows are raised by a motor in response to depression of a button. The button can be released after an initial depression, and the window will continue to rise to close a window opening. These systems are usually configured to stop power to the motor if the window contacts an obstacle in the path of window travel during the closure.

SUMMARY

An obstacle detection system is provided that prevents contact of a movable component with an obstacle. The system includes a first component and a second component. A motor is operatively connected to both the second component and a power source. The motor is configured to move the second component toward the first component when the motor is powered by the power source. Radio frequency identification tags (RFIDs) are connected to one of the first component and the second component. A controller is operatively connected to the motor and has a transmitter operatively connected to the other of the first component and the second component. The transmitter is operable to create a magnetic field between the first component and the second component. Each of the RFIDs is operable to provide a respective signal in response to the field. A receiver is configured to receive the respective signals. The controller is configured to modify power delivery from the power source to the motor when the respective signals received by the receiver change due to at least a portion of the magnetic field being at least partially blocked or attenuated.

In one embodiment, the first component is a weather seal on a vehicle door frame, and the second component is the door window movable toward the weather seal.

The RFIDs may be configured such that the respective signals provided by the RFIDs are digitally encoded with a predetermined waveform or other characteristic. The controller may be configured to determine whether the respective signals received by the receiver have the predetermined waveform or other characteristic, and to disregard any signals received by the receiver that do not have the predetermined waveform or other characteristic when determining whether the respective signals received by the receiver have changed. Such encoding of the RFID signals would enable the controller to differentiate between reflected signals or "noise" received by the receiver from signals actually emanating from the RFIDs, as only signals actually emanating from the RFIDs would have the predetermined waveform or other characteristic. The controller would thus be able to determine with greater accuracy whether signals received from the RFIDs have changed.

A method of detecting an obstacle between a first component and a second component movable by a motor toward the first component includes modifying power to the motor to modify movement of the second component when signals emitted by radio frequency identification tags (RFIDs) mounted to the first component change due to the field being at least partially blocked or attenuated by the obstacle. Stopping the second component when the signals emitted change prevents the second component from contacting the obstacle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration in side view of a vehicle door assembly with a power window and an obstacle detection system for use during closure of the window;

FIG. 2 is a schematic illustration in partial cross-sectional view taken at lines 2-2 in FIG. 1 of a weather seal with embedded RFIDs and a portion of the window with a transmission conductor for transmitting a magnetic field to the RFIDs;

DETAILED DESCRIPTION

Figure 3:
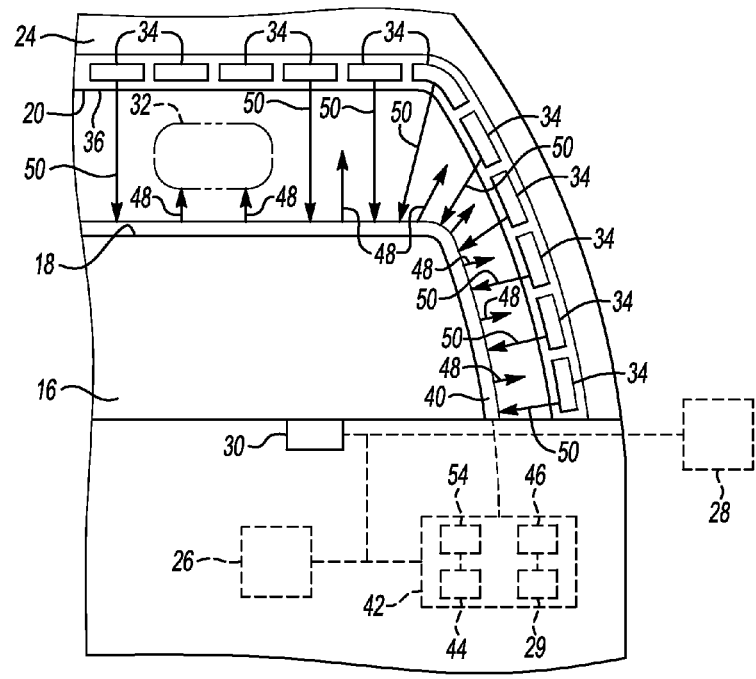
FIG. 3 is a schematic illustration in fragmentary view of the vehicle door assembly of FIG. 1 showing an obstacle in phantom blocking a portion of the magnetic field from reaching the RFIDs.

Referring to the drawings, wherein like reference numbers refer to like components throughout the several views, FIG. 1 shows a vehicle door 10 equipped with a vehicle window assembly 12 with an obstacle detection system 14. The window assembly 12 includes a vehicle window 16 supported on a track (not shown) between inner and outer panels of the door 10 for movement between an open position and a closed position, as is understood by those skilled in the art. In a closed position, the perimeter 18 of the window 16 abuts a weather seal 20 that is secured to the door 10 around an edge of a window opening 22 defined by the door frame 24. In FIGS. 1 and 2, the window 16 is shown raised to an almost closed position. The weather seal 20 is referred to herein as a first component of the obstacle detection system 14, and the window 16 is referred to as the second component. Although the weather seal 20 shown in FIG. 1 is attached to the door frame 24, it could alternatively be attached to the body, such as for a door with no window frame.

The window assembly 12 is a power window assembly, as an electric motor 26 is powered by a power source 28 to raise and lower the window 16. An operator input device, such as a depressible button 30 is mounted to the door 10. When depressed, the button 30 establishes electrical power flow from a power source 28 to an electric motor 26 that is connected to the window 16 to raise and lower the window 16. For example, the power source 28 may be a vehicle battery located in a vehicle engine compartment and connected to the door 10 by electrical wiring. Alternately, an optional power source 29 within a controller 42 (described herein) may be used. The power source 28 may be remote from the door 10. Various types of operator input devices are known in the art, including toggle buttons and buttons with an up position and a down position. These operator input devices may or may not be located on the door assembly 10, may be located at some other location in the vehicle, or may be a device used to remotely operate the window assembly 12.

A vehicle driver or passenger may select to depress the button 30 to cause the motor 26 to be powered by the power source 28 to move the window 16 toward the weather seal 20. The obstacle detection system 14 prevents the window 16 from contacting an obstacle 32 located between the window 16 and the weather seal 20 while the window 16 is being raised. A representative obstacle 32 is shown in phantom in FIG. 3. The obstacle detection system 14 utilizes radio frequency identification tag (RFID) technology to enable obstacle detection and stop the moving component without the moving component (i.e., the window 16) or any other component contacting the obstacle 32.

The obstacle detection system 14 includes a plurality of radio frequency identification tags (RFIDs) 34 connected to the weather seal 20. The RFIDs 34 may be embedded in the weather seal 20 along a periphery 36 of the weather seal 20. The RFIDs 34 may be a string of discrete RFIDs each of which is only microns in length. RFIDs of such a small dimension may enable coextrusion of the RFIDs with the weather seal 20.

The weather seal 20 of FIG. 3 with the RFIDs 34 spaced as shown represents a preferred physical condition of the weather seal 20, as the RFIDs 34 are spaced across an entire periphery 36 of the weather seal 20. Only a portion of the weather seal 20 is shown in FIG. 3, but the RFIDs 34 continue across the entire periphery 36 shown in FIG. 1. In other embodiments, fewer or more RFIDs 34 may be used, or RFIDs 34 may be located only along certain portions of the periphery 36 of the weather seal 20. The RFIDs 34 are shown as rectangular in shape in the schematic illustration of FIGS. 1 and 3, with an oval cross-section in the cross-sectional view of FIG. 2. RFIDs with other shapes, such as round RFIDs, may be used within the scope of the claimed invention. Other shapes of the weather seal 20 may be used within the scope of the claimed invention.

The obstacle detection system 14 also includes a transmission conductor 40 of wire or other metallic strip secured to the perimeter 18 of the window 16. The conductor 40 may be adhered or otherwise secured to or embedded in the window 16. A controller 42 is operatively connected to the conductor 40, the motor 26 and the power source 28. The controller 42 has a processor 44 with a stored algorithm that causes the controller 42 to modify power from the power source 28 to turn off the motor 26, reduce output of the motor 26, pause the motor 26, or reverse the direction of the motor 26 when an obstacle 32 is detected. In other embodiments, the RFIDs 34 may be mounted to the window 16 and the transmission conductor 40 may be connected to the weather seal 20.

The controller 42 also includes a transmitter 46 that is operatively connected to the conductor 40 on the window 16. The transmitter 46 is operable to send electrical energy to the conductor 40 to create a field 48 between the window 16 and the weather seal 20. The field is represented by arrows 48, and extends outward from the conductor 40 along the entire length of the conductor 40.

Each of the RFIDs 34 is operable to provide a respective signal 50 in response to the field 48. The signal may be a digitally encoded radio wave with a unique waveform, frequency, or other identifying characteristic. However, the obstacle 32 blocks the field 48 from reaching some of the RFIDs 34. Those RFIDs 34 that are not exposed to the magnetic field 48 do not provide a signal 50.

Figure 4:
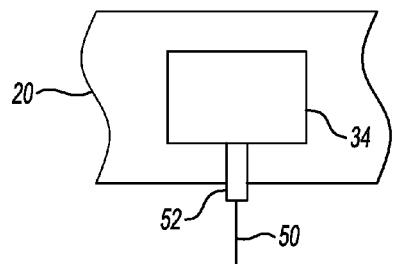
FIG. 4 is a schematic illustration in plan view of one embodiment of one of the RFIDs of FIG. 3.
Figure 5:
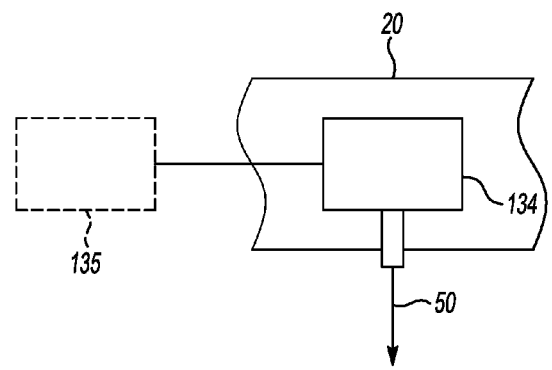
FIG. 5 is a schematic illustration in plan view of an optional alternate active RFID tag.

In the embodiment shown, the RFIDs 34 are passive tags, that each have an antenna 52, shown in FIG. 4, that receives the field 48. Passive RFIDs use energy provided by the magnetic field to generate the signal 50. In other embodiments, RFIDs may be active-type RFIDs 134, as shown in FIG. 5. An active RFID 134 provides a signal 50 in response to the field 48 by using its own power source 135.

The signals 50 are transmitted via the conductor 40 to a receiver 54 of the controller 42. The receiver 54 transmits data representative of the signals 50 received to the processor 44. The processor 44 compares the data representative of the signals 50 received to a stored array of data corresponding with a set of signals 50 received from the RFIDs 34 when no obstacle is present to block any of the field 48. The processor 44 repeatedly performs this comparison in small increments of time as the window 16 is being raised by the motor 26. When an obstacle is present, the number of signals 50 emanating from the RFIDs 34 and received by the receiver 54 is different than the number of signals represented by the stored array of data (i.e., the number of signals expected to be received from the RFIDs 34 when no obstacles are present). The controller 42 may be configured to determine whether the respective signals received by the receiver 54 have the predetermined waveform or other characteristic by comparing each signal received to the predetermined waveform or other characteristic. Signals that are reflected or radiated rather than directly emanate from the RFIDs 34 will have a phase difference or other identifiable difference from the encoded signals 50. Signals received that do not have the predetermined waveform or other characteristic are disregarded by the controller 42, and thus do not affect the determination of whether the respective signals actually emanating from the RFIDs 34 and received by the receiver 54 have changed. Such encoding of the RFID signals 50 would enable the controller 42 to differentiate between reflected signals or "noise" received by the receiver from signals 50 actually emanating from the RFIDs 34, as only signals 50 actually emanating from the RFIDs would have the predetermined waveform or other characteristic. The controller 42 would thus be able to determine with greater accuracy whether signals received from the RFIDs 34 have changed (i.e., are different from the stored array of data representative of the set of signals 50 received when no obstacle is present).

An obstruction may completely block some of the field or cause a portion of the field to be attenuated. Depending on the attenuation coefficient of the obstacle 32, a portion of the field 48 may be attenuated rather than completely blocked. The stored array of data in the controller 42 may allow the controller 42 to determine whether attenuation of the signals 50 has occurred, and whether the level of attenuation is indicative of the presence of an obstacle 32. The stored array of data may represent a predetermined level of attenuation that is allowable without causing the controller 42 to determine that the signals 50 have changed.

When the processor 44 determines from the comparison that the data representative of the signals 50 received is different than the stored array of data, the controller 42 sends a control signal to modify power supplied to the motor 26, thus stopping, pausing, slowing or reversing the motor 26. The control signal 42 may open a switch or otherwise disrupt power to the motor 26. Because the determination made by the processor 44 can be made almost instantaneously when an obstacle 32 first enters the space between the window 16 and the weather seal 20 and disrupts the field 48, the motor 26 is stopped, paused, slowed, or reversed before the window 16 contacts the obstacle 32. The controller 42 is configured to cause the power source 28 to cease power to the motor 26 when the respective signals 50 received by the receiver 54 change due to at least a portion of the field 48 being blocked or attenuated by the obstacle 32.

Figure 6:
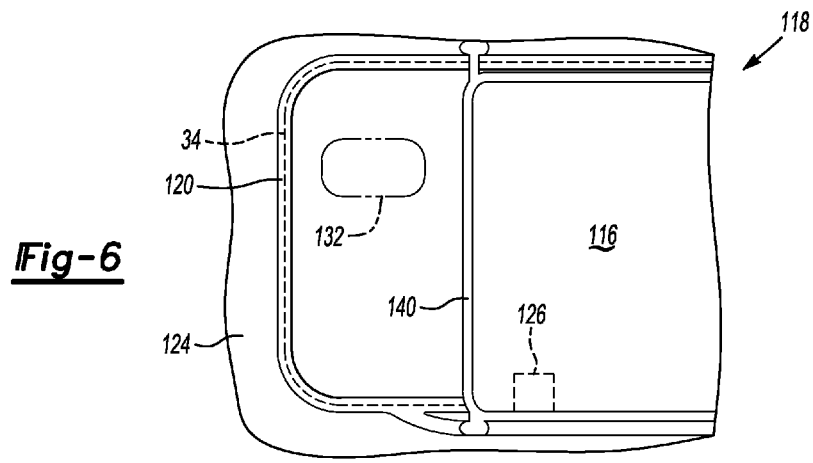
FIG. 6 is a schematic illustration in schematic side view of a vehicle power closure with an obstacle detection system.
Figure 7:
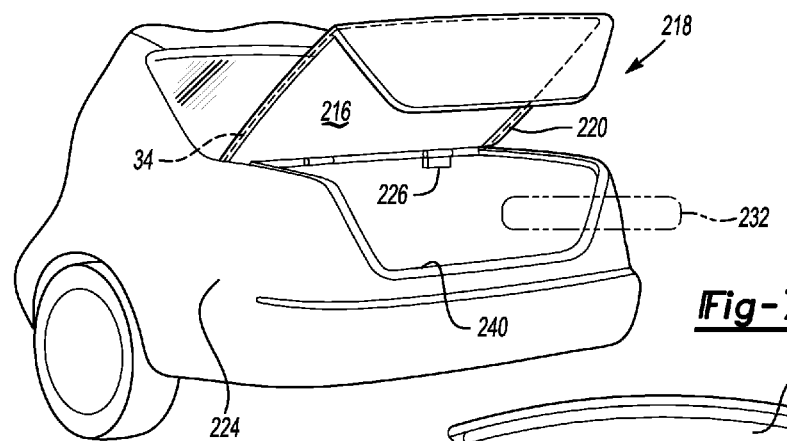
FIG. 7 is a schematic illustration in schematic perspective view of a vehicle power closure with an obstacle detection system.
Figure 8:
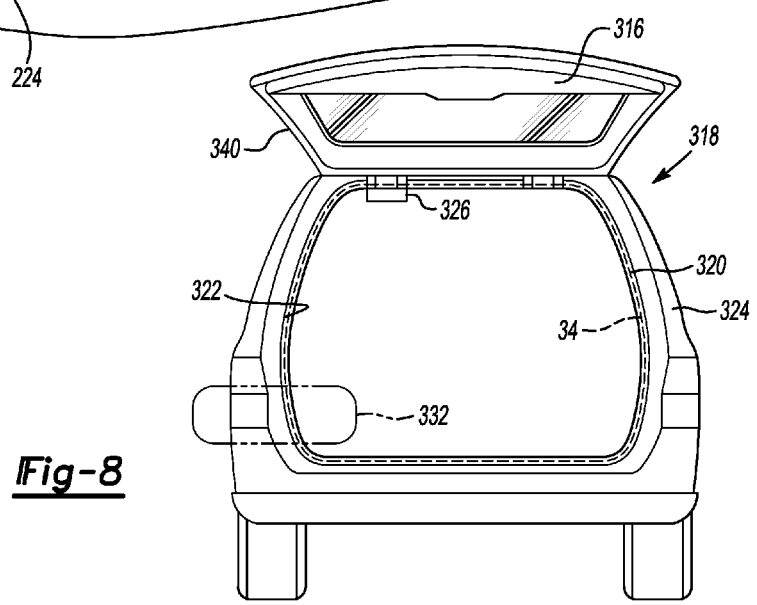
FIG. 8 is a schematic illustration in schematic perspective view of a vehicle liftgate with an obstacle detection system.

FIGS. 6-8 show other embodiments of obstacle detection systems for use on a vehicle. In FIG. 6, an obstacle detection system 118 includes RFIDs 34 in a weather seal 120 around a stationary component 124, such as a door frame or roof panel supporting a vehicle power closure 116, such as a door or a sun roof closure. A conductor 140 is placed around the perimeter of the closure 116. The RFIDs 34 and conductor 140 function as described with respect to the RFIDs 34 and conductor 40 of FIG. 3. A controller (not shown) like that of FIG. 1 stops, pauses, reverses or slows a motor 126 that powers the closure 116 when closing to prevent the closure 116 from contacting the obstacle 132 when an obstacle 132 is in the opening between the seal 120 and the closure 116.

FIG. 7 shows an obstacle detection system 218 that includes RFIDs 34 in a weather seal 220 of a closure panel 216. The closure panel 216 may be a deck lid for a trunk or a hood for an engine compartment. A conductor 240 is placed around a perimeter of the vehicle body 224 at the deck lid opening. The RFIDs 34 and conductor 240 function as described with respect to the RFIDs 34 and conductor 40 of FIG. 3. A controller (not shown) like that of FIG. 1 stops, pauses, slows, or reverses a motor 226 that powers the closure panel 216 to prevent the closure panel 216 from contacting an obstacle 232 when the obstacle 232 is in the opening between the seal 220 and the closure panel 216.

FIG. 8 shows an obstacle detection system 318 that includes RFIDs 34 in a weather seal 320 around a portion of a vehicle frame 324 that defines a liftgate opening 322. A liftgate 316 is powered by a motor 326 to open, allowing access to the vehicle interior, and also to close the opening 322. An obstacle detection system 318 includes RFIDs 34 in a weather seal 320 of the liftgate 316. A conductor 340 is placed around a perimeter of liftgate 316. The RFIDs 34 and conductor 340 function as described with respect to the RFIDs 34 and conductor 40 of FIG. 3. A controller (not shown) like that of FIG. 1 stops, pauses, slows, or reverses the motor 326 to prevent the liftgate 316 from contacting an obstacle 332 when the obstacle 332 is in the opening between the seal 320 and the liftgate 316.

In each of FIGS. 6-8, the RFIDs 34 may be located on the moving component (i.e., the closure 116, the closure panel 216 and the liftgate 316), with the respective conductor placed on the stationary component (i.e., the stationary component 124, the vehicle body 224, and the frame 324).

While the best modes for carrying out the invention have been described in detail, those familiar with the art to which this invention relates will recognize various alternative designs and embodiments for practicing the invention within the scope of the appended claims.

The invention claimed is:

1. An obstacle detection system comprising:
a first component;
a second component;
a power source;
a motor operatively connected to the second component and the power source; wherein the motor is configured to move the second component toward the first component when the motor is powered by the power source;
a plurality of radio frequency identification tags (RFIDs) connected to one of the first component and the second component;
a controller operatively connected to the motor and having:
a transmitter operatively connected to the other of the first component and the second component; wherein the transmitter is operable to create a magnetic field between the first component and the second component; wherein each of the RFIDs is operable to provide a respective signal in response to the magnetic field; and
a receiver configured to receive the respective signals;
wherein the controller is configured to cause the power source to modify power to the motor when the respective signals received by the receiver change due to at least a portion of the magnetic field being at least partially blocked or attenuated;
wherein the first component is a weather strip supported by a vehicle door frame around an opening in the door frame; wherein the second component is a vehicle window configured to close the opening when moved;
wherein the transmitter includes a conductor secured to at least a portion of a perimeter of the vehicle window; and
wherein the RFIDs are embedded in the weather strip.

2. The system of claim 1, wherein the RFIDs utilize energy of the magnetic field to generate the respective signals.

3. The system of claim 1, wherein the RFIDs are powered by the power source independent of the magnetic field.

4. The system of claim 1, wherein the RFIDs are configured such that the respective signals provided by the RFIDs are digitally encoded with a predetermined waveform;
wherein the controller is configured to determine whether the respective signals received by the receiver have the predetermined waveform; and wherein the controller is configured to disregard any signals received by the receiver that do not have the predetermined waveform when determining whether the respective signals received by the receiver have changed.

5. A vehicle window assembly with obstacle detection comprising:
a door frame defining a window opening and having a weather seal secured around at least a portion of the window opening;
a window secured to the door frame and movable toward the weather seal;
a power source;
a motor operatively connected to the window and to the power source; wherein the motor is configured to move the window toward the weather seal when the motor is powered by the power source to close the window opening;
a plurality of radio frequency identification tags (RFIDs) connected to the weather seal;
a controller operatively connected to the motor and having
a transmitter including a conductor operatively connected to a periphery of the window and operable to create a magnetic field between the window and the weather seal; wherein each of the RFIDs is operable to provide a respective signal in response to the magnetic field; and
a receiver configured to receive the respective signals;
wherein the controller is configured to cause the power source to modify power to the motor when the number of the respective signals received by the receiver changes due to at least a portion of the magnetic field being blocked or attenuated by an obstacle in the window opening, thereby preventing the window from contacting the obstacle;

wherein the RFIDs are configured such that the respective signals provided by the RFIDs are digitally encoded with a predetermined characteristic;

wherein the controller is configured to determine whether the respective signals received by the receiver have the predetermined characteristic; and wherein the controller is configured to disregard any signals received by the receiver that do not have the predetermined characteristic when determining whether the number of respective signals received by the receiver has changed.

6. The vehicle window assembly of claim 5, further comprising:

an operator input device operatively connected to the motor and the controller; wherein the controller provides power to the motor to move the window toward the weather seal when the operator input device is depressed and released.

7. The vehicle window assembly of claim 5, wherein the RFIDs utilize energy of the magnetic field to generate the respective signals.

8. The vehicle window assembly of claim 5, wherein the RFIDs are powered by the power source independent of the magnetic field.

9. An obstacle detection system comprising:

a first component;

a second component;

a power source;

a motor operatively connected to the second component and the power source; wherein the motor is configured to move the second component toward the first component when the motor is powered by the power source;

a plurality of radio frequency identification tags (RFIDs) connected to one of the first component and the second component;

a controller operatively connected to the motor and having:

a transmitter operatively connected to the other of the first component and the second component; wherein the transmitter is operable to create a magnetic field between the first component and the second component; wherein each of the RFIDs is operable to provide a respective signal in response to the magnetic field; and a receiver configured to receive the respective signals;

wherein the controller is configured to cause the power source to modify power to the motor when the respective signals received by the receiver change due to at least a portion of the magnetic field being at least partially blocked or attenuated;

wherein the RFIDs are configured such that the respective signals provided by the RFIDs are digitally encoded with a predetermined characteristic;

wherein the controller is configured to determine whether the respective signals received by the receiver have the predetermined characteristic; and wherein the controller is configured to disregard any signals received by the receiver that do not have the predetermined characteristic when determining whether the respective signals received by the receiver have changed.

10. The system of claim 9, wherein the first component is a weather strip supported by a vehicle door frame around an opening in the door frame; and wherein the second component is a vehicle window configured to close the opening when moved.

11. The system of claim 10, wherein the RFIDs are embedded in the weather strip.

12. The system of claim 10, wherein the transmitter includes a conductor secured to at least a portion of a perimeter of the vehicle window; and wherein the RFIDs are embedded in the weather strip.

13. The system of claim 9, wherein the transmitter includes a conductor secured to at least a portion of a perimeter of the vehicle window.

14. The system of claim 9, wherein the first component is a vehicle body; and wherein the second component is a closure panel.

15. The system of claim 14, wherein the closure panel is a hood, a deck lid, a liftgate, a vehicle door, or a sun roof.

16. The system of claim 9, wherein the RFIDs utilize energy of the magnetic field to generate the respective signals.

17. The system of claim 9, wherein the RFIDs are powered by the power source independent of the magnetic field.

* * * * *